United States Patent
Delsuc et al.

(10) Patent No.: US 9,444,815 B2
(45) Date of Patent: Sep. 13, 2016

(54) METHOD AND SYSTEM FOR ACCESSING A SERVICE

(71) Applicant: GEMALTO SA, Meudon (FR)

(72) Inventors: Julien Delsuc, La Ciotat (FR); Sylvain Chafer, La Ciotat (FR); Sébastien Hecart, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/647,269

(22) PCT Filed: Nov. 27, 2013

(86) PCT No.: PCT/EP2013/074897
§ 371 (c)(1),
(2) Date: May 26, 2015

(87) PCT Pub. No.: WO2014/083072
PCT Pub. Date: Jun. 5, 2014

(65) Prior Publication Data
US 2015/0304318 A1    Oct. 22, 2015

(30) Foreign Application Priority Data
Nov. 27, 2012   (EP) .................................... 12306470

(51) Int. Cl.
*G06F 7/04*       (2006.01)
*H04L 29/06*     (2006.01)

(52) U.S. Cl.
CPC ....... *H04L 63/0853* (2013.01); *H04L 63/0815* (2013.01); *H04L 63/0884* (2013.01); *H04L 63/18* (2013.01)

(58) Field of Classification Search
CPC .............................. G06F 21/33; H04L 9/3213
USPC ........................................................... 726/7
See application file for complete search history.

(56) References Cited

U.S. PATENT DOCUMENTS

| 8,625,803 B1* | 1/2014 | Radhakrishnan ... H04L 63/0428 380/279 |
|---|---|---|
| 9,130,664 B2* | 9/2015 | Jin .......................... H04B 11/00 |
| 2003/0211841 A1 | 11/2003 | Castrogiovanni et al. |
| 2006/0021004 A1 | 1/2006 | Moran et al. |
| 2012/0144464 A1 | 6/2012 | Fakhrai et al. |

OTHER PUBLICATIONS

International Search Report (PCT/ISA/210) mailed on Feb. 20, 2014, by the European Patent Office as the International Searching Authority for International Application No. PCT/EP2013/074897.
Search Report dated Apr. 29, 2013, by the European Patent Office for Application No. 12306470.

* cited by examiner

*Primary Examiner* — Anthony Brown
(74) *Attorney, Agent, or Firm* — Buchanan Ingersoll & Rooney PC

(57) ABSTRACT

To access a service, each user device stores one first key. The user device is connected to a first server. A terminal sends to a second server a connection request. The second server responds with first data relating to a transaction identifier and an associated challenge. The terminal determines a first result depending upon the first data and the first key. The terminal sends to the first server the first result and user device data. The first server identifies a user device based upon the user device data and sends to the device the first result. The device determines the challenge and the transaction identifier based upon the first result and the first key and sends to the second server the challenge and the transaction identifier. The second server verifies whether the data received from the device matches the first data and, if so, authorizes the terminal to connect.

10 Claims, 1 Drawing Sheet

METHOD AND SYSTEM FOR ACCESSING A SERVICE

FIELD OF THE INVENTION

The invention relates generally to a method for accessing a service.

Furthermore, the invention also pertains to a system for accessing a service.

STATE OF THE ART

A solution, termed federated authentication, allows accessing one or several servers, as service provider(s), by supplying from a Personal Computer (or PC) a unique user name and possibly a corresponding password, as user credentials. The user credentials are related to a reference server, termed ID provider, before which the PC user has an account.

The reference server stores the user credentials and user personal data as well.

The PC user accesses any service provider by providing only her/his user credentials relating to the reference server, so as to identify/authenticate the PC user.

Thus, the PC user does not need to be registered before each service provider and to memorize her/his user credentials relating to each service provider.

However, such a known solution implies to disclose to the reference server the user personal data. The user must often waive her/his rights to her/his personal data when subscribing to a service offered by the reference server.

There is a need to provide a solution that allows a user to keep control on her/his data without having to be registered before each server(s), as service provider(s).

SUMMARY OF THE INVENTION

The invention proposes a solution for satisfying the just herein above specified need by providing a method for accessing a service.

According to the invention, each of at least one user device stores at least one first key. At least one user terminal stores or accesses the at least one first key. At least one user device is connected to a first server. The method comprises the following steps. The terminal sends to at least one second server a connection request for connecting to the second server. The second server sends, as response to the connection request, to the terminal first data relating to a transaction identifier and a challenge. The challenge is associated with the transaction identifier. The terminal determines a first result depending upon at least one of the challenge and the transaction identifier of the first data and the first key. The terminal sends to the first server the first result and data relating to a user device. The first server determines a user device to be addressed based upon the data relating to a user device. The first server sends to the device the first result. The device determines the challenge and the transaction identifier based upon the first result and the first key. The device sends to the second server the challenge and the transaction identifier, as second data. The second server verifies that the second data received from the device does match the first data sent to the terminal. And only if the second data matches the first data, the second server authorizes the terminal to connect to the second server.

The principle of the invention is firstly to share a key between a terminal(s) and one device for one user and to connect the device to a first server, to connect the terminal to a second server, to collect at the terminal from the second server a challenge and a corresponding identifier relating to a transaction. Then, the terminal generates a first result based upon the collected information and the shared key. The terminal transmits to the first server the first result along with data allowing to identify a corresponding user device. The first server forwards to the identified user device the first result. The device deduces, from the first result and the shared key, the challenge and the transaction identifier. The device transmits to the second server the challenge and the transaction identifier. The second server permits a connection from the terminal when the issued challenge and the issued transaction identifier have been successfully returned by the device.

The second server outputs a challenge and a transaction identifier that have to be both relayed by the terminal, the first server and the device, so as to be input back to grant access from the terminal.

The second server authenticates the terminal when the outputted challenge and the transaction identifier have been fed back (to the second server).

It is to be noted that one user device is paired with one terminal or a plurality of terminals. The pairing of the user device with each concerned terminal may be carried out by using any type of communication technology, be it wired, wireless or contact-less.

It is noteworthy that the invention implies that the user device has been paired beforehand with the terminal that requests access to a second server and the device is connected to both first and second servers.

In other words, the terminal that requests access to a second server has to be paired with a user device which has to be connected to the first and second servers.

Otherwise, the terminal is unable to access successfully the second server. As a matter of fact, when the requesting terminal is not paired with a device and/or the paired device is not connected, the second server is unable to receive a challenge and a transaction identifier that have both to be propagated, in a certain way, from the second server to the device.

Contrary to the aforementioned known solution, the invention first server, as reference server, does not need to store any user data, like user credentials and/or user personal data, so as to access a second server, as service provider.

The invention solution allows authenticating a paired terminal to a user device since a non-paired terminal is not able to access a second server due to an absence of a key that is shared between the user device and the terminal.

The invention solution allows the user to control access to a second server by authorising only a terminal paired with the user device that is connected to a first server and the second server. A connection or a non-connection of the user device to the first and second servers allows authorising or prohibiting respectively access to the second server.

The invention solution also allows protecting the user privacy since no user data, like personal data or user credentials, that is stored within the user device and/or the paired terminal, needs to be revealed, i.e. exported during a request for connecting to the second server.

Moreover, the invention solution allows the user to keep control on the user data, so as to access a service provided by the second server.

The user device may be situated in a distant location with respect to a location occupied by the user terminal. Thus, the terminal user does not need to carry the user device with her/him. Moreover, except for accessing the second server to be selected, the user does not need to be involved, so as to access securely the second server.

The invention solution is therefore user friendly.

According to a further aspect, the invention is a system for accessing a service.

According to the invention, the system comprises a first server and at least one second server, at least one user device and at least one user terminal. Each of the at least one user device comprises means for storing at least one first key. At least one user terminal comprises means for storing or accessing the at least one first key. The user device comprises or is connected to means for connecting to the first server. The terminal comprises means for sending to one second server a connection request for connecting to the second server. The second server comprises means for sending, as response to the connection request, to the terminal first data relating to a transaction identifier and a challenge. The challenge is associated with the transaction identifier. The terminal comprises means for determining a first result depending upon at least one of the challenge and the transaction identifier of the first data and the first key and means for sending to the first server the first result and data relating to a user device. The first server comprises means for determining a user device to be addressed based upon the data relating to a user device and means for sending to the device the first result. The device comprises means for determining the challenge and the transaction identifier based upon the first result and the first key and means for sending to the second server the challenge and the transaction identifier, as second data. The second server comprises means for verifying that the second data received from the device does match the first data sent to the terminal and means for authorizing, only if the second data matches the first data, the terminal to connect to the second server.

As user device, it may be any device connected directly or indirectly, i.e. through at least one network access point, to the first server and/or the second server. The user device may be constituted by a terminal or a token.

As token, it may be either a Universal Serial Bus (or USB) type dongle, a smart card, as removable token, to be coupled to either a PC or a network access point, or a chip intended to be fixed, possibly in a removable manner, to a PC or a network access point, as hosting device.

As to the terminal paired with the user device, it may be any device that is able to be connected to a first and a second server.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing a service is implemented by, among others, a USB type dongle, as removable token and user device. The removable token is coupled to a PC, as hosting device and terminal.

According to another embodiment, instead of a removable token, as user device, coupled to a hosting device, a contact-less token, like a Wifi and/or Bluetooth token, as stand-alone entity, is coupled to a contact-less router or gateway. The contact-less router or gateway is connected to a communication network, such as Internet. The contact-less token may be also wireless, such as 3G or 4G compliant.

According to still another embodiment, instead of a token, a PC, as user device for accessing a service, is a stand-alone entity (not represented). The PC also carries out functions that are carried out by the token and that are described infra.

Within the present description, a token is a smart object that is intended to communicate with the outside world.

Naturally, the herein below described embodiment is only for exemplifying purposes and is not considered to reduce the scope of the invention.

For example, instead of being a USB type dongle, the token may be a contact-less smart dongle of the USB type, a smart card or any other electronic medium that may have different form factors while including at least one chip.

According to another example, the token may also be one chip that is soldered or fixed, possibly in a removable manner, to a PC, as hosting device.

Figure 1:
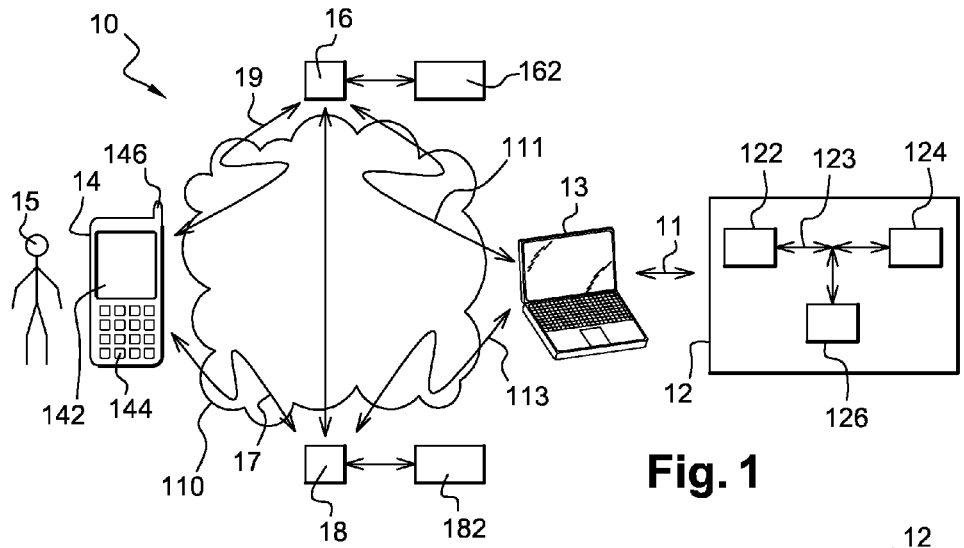
FIG. 1 illustrates a simplified diagram of one embodiment of a system for accessing a service comprising a central server, as first server, a service provider, as second server, a token, as user device, that is coupled to a PC which is connected to the two servers and a mobile (tele)phone, as terminal, paired with the token, according to the invention.

FIG. 1 shows schematically a system 10 for accessing a service.

Such a system 10 includes a USB type dongle 12, as removable token and first device, a PC 13, a mobile phone 14, as terminal, a central remote server 16, as first server, and a remote service provider 18, as second server.

For sake of simplicity, the USB type dongle 12, the mobile phone 14, the central remote server 16, and the service provider 18 are termed hereinafter the token 12, the phone 14, the first server 16 and the second server 18.

A user 15 desires to access one or several services. The considered services are provided by the second server 18. The services may be of any type, like a selling of a product(s) and/or a service(s).

The token 12, as user device for accessing a service, may be located in an individual's house or a factory, i.e. in a distant location with respect to the phone 14 location.

It is to be noted that only one token 12, as user device for accessing a service, is represented for clarity reason.

However, the first server 16 may be connected to a plurality (or fleet) of user devices for accessing a service.

Instead of a token, as user device, it may be a mobile phone, a PC, a set-top box, a smart TeleVision (or TV), a game console, or any electronic device including a (micro) processor, as data processing means, at least one memory and at least one Input/Output (or I/O) interface.

The token 12 is connected, through a bi-directional contact link 11, to the PC 13.

Instead of a bi-directional contact link, the token 12 is connected, through a contact-less link (not represented), i.e. a short range Radio-Frequency (or RF) link, to the PC 13. Such a short range RF link is used for exchanging between the PC 13 and the token 12 data at a short range distance.

The short range distance is typically from around 20 cm (such as with a Near Field Communication (or NFC) type technology) until around 800 m (such as with a Bluetooth type technology).

The token 12, as user device, is adapted to operate only when a device that has been previously paired with the token 12 and connected directly or indirectly, i.e. over an intermediary entity coupled to or connected to the user device, to one or several networks. Such a pairing with the token 12 and a connection of the token 12 to the network(s) constitute preliminary conditions to be satisfied.

The token 12 includes at least one chip (not represented). The token chip includes at least one microprocessor 122, as data processing means, at least one memory 124 and at least one I/O interface 126 that are internally all connected, through an internal bidirectional data bus 123, to each other.

The token I/O interfaces 126 allow communicating data from the internal chip components to the outside of the chip and conversely.

The token I/O interfaces 126 allow exchanging data with the PC, as hosting device.

The token I/O interfaces 126 allow the token 12 to pair with at least another device, like one or several terminals and/or one or several tokens, by exchanging data.

The token microprocessor 122 processes, controls and communicates internally data, with all the other components incorporated within the chip and, through the I/O interfaces 126, with the chip exterior.

The token microprocessor 122 executes or runs several applications.

The token microprocessor 122 is preferably able to initiate actions, in order to interact directly with the outside world, in an independent manner of a PC 13, as device hosting the token 12. Such a capacity of interaction at the initiative of the token 12 is also known as proactive capacity. The token 12 is thus able to send data, at its own initiative, through the PC 13, to any device connected to the PC 13. For instance, the token 12 sends to the hosting device a proactive command for sending either a command to a first server 16, like a request(s) for knowing whether at least one connection request for connecting to a second server 18 is pending, or information to the second server 18, like a transaction identifier and a challenge.

The token microprocessor 122 executes preferably security functions, in order to protect access to information stored and managed through or by the token 12.

The security functions include preferably a user authentication process. The user authentication process may be used before reading data stored within the token memory 124. To authenticate the user, the token 12 may store an application for verifying user authentication data stored securely within the token memory 124 and to be input by the token user. The token 12 compares user input data to the stored user authentication data and authorize, when successful, a further prosecution, like a running of an application for accessing a service supported by the token 12, like a remote authentication(s) of a paired device and/or a token user.

The security functions include preferentially an encryption/decryption process to be used prior to sending data to outside/after receiving data from outside, so as to protect access to data managed by the token 12. To encrypt data to be sent, the token 12 uses a key and a predetermined algorithm, like an encryption algorithm, such as an Advanced Encryption Standard (or AES), a Data Encryption Standard (or DES) or the like, that are both stored within the token memory 124. To decrypt data to be received, the token 12 uses a key and a predetermined algorithm, like a decryption algorithm, such as an AES, a DES or the like, that are both stored within the token memory 124. The decryption algorithm is the inverse algorithm of the encryption algorithm that is used at an emitter side, like the first server 16 and/or the phone 14, as (out-of-band) paired device.

The security functions include preferably an interlocutor authentication process. The interlocutor authentication process is used prior to exchanging, with a first server 16 and possibly a second server 18, data stored within the token memory 124. To authenticate the interlocutor, the token 12 may store an application for verifying interlocutor authentication data that is previously stored securely within the token memory 124 and to be input by the interlocutor. The token 12 compares interlocutor input data to the stored server authentication data. Alternately, the token 12 ensures that the originator of data which the token 12 receives is a server that is genuine and authentic. For example, the token 12 recognizes that its interlocutor is the first server 16 if this latter provides a certificate, said first certificate, relating to the first server 16. The token 12 authorizes, when the server is successfully authenticated, a further prosecution, like a running of an application for accessing a service supported by the token 12. The interlocutor authentication process allows the token 12 to be reached only by the first server 16 that the token 12 has previously authenticated. The interlocutor authentication process may allow the token 12 to reach a second server 18 that the token 12 may have previously authenticated.

The token 12 stores, preferably in a secure manner, within its memory 124, data for identifying the token, such as an International Mobile Subscriber Identity (or IMSI) and/or an Integrated Circuit Card Identifier (or ICCID), as a unique number associated with all mobile radio-communication network(s) that may be used for accessing a first server 16 and/or a second server 18.

The IMSI is used for identifying a subscriber in relation to one or several mobile radio-communication networks.

The mobile radio-communication network list is not exhaustive but only for exemplifying purposes.

A data communication network(s) 110 include(s) a mobile radio-communication network(s) and/or an Internet network that is possibly connected to the mobile radio-communication network(s).

In another embodiment, the data communication network includes a fixed communication network, such as Internet network.

The token memory 124 may store one or several Subscriber Identity Module (or SIM) type applications that allow authenticating to a mobile radio-communication network(s) 110.

Instead of a mobile radio-communication network(s), it may be constituted by an Internet network accessible, via a contact-less link, like a Wifi or Bluetooth type link, through an intermediate entity, as Internet access point.

The token 12 stores, preferably in a secure manner, within its memory 124, data for authenticating the token 12, like a certificate, said second certificate, relating to the token 12. The token 12 is able to provide a token interlocutor(s), like the first server 16 and/or the second server 18, with data for authenticating the token 12.

The token memory 124 may store securely data relating to the concerned user, as personal user data. The user data may include user credentials, like a user name(s) and possibly a password(s), so as to log in to a server(s). The user data may include a banking account number, a first name, a last name, a birth date and/or other data.

In a preferred embodiment, the token memory 124 stores securely data relating to a first server 16. The data relating to the first server 16 allows identifying the first server 16, as a single entity which the token 12 authorizes to access and/or to be accessed by. The data relating to a first server 16 includes an Internet Protocol (or IP) address of the first server 16, a Uniform Resource Locator (or URL) and/or a Uniform Resource Identifier (or URI) relating to the first server 16. The token 12 is preferably able to address, at the token initiative, the first server 16 by sending this latter one or several requests for knowing whether one or several connection requests for connecting to a second server(s) 18 is or are pending.

The token 12 is paired out-of-band with at least one other device, like a phone 14, as terminal, or another token (not represented), like a chip soldered on a terminal Printed Circuit Board (or PCB) or a removable smart card, that is coupled to a user terminal.

The out-of-band pairing between the token 12 and the concerned terminal (or another token) is carried out preferably when they are physically close to each other, by using, for instance, a short range RF link. Once paired with the token 12, the terminal (or another token), as paired device, may be brought away from the token 12. The paired terminal (or another token), as paired device, may then be used for accessing, from the concerned terminal, one or several services offered by one or several second servers 18. Thus, the token 12 is paired with a device, the phone 14, as terminal, or another token, that is able to authorize access to a second server 18, in a distant manner with respect to the token 12. The token 12 provides the (out-of-band) paired device with data, like data relating to the token 12. The data relating to the token 12 allows identifying uniquely the paired token 12. The data relating to the token 12 is associated with a first key k1 shared between the token 12 and the paired device. The shared first key k1 allows the token 12 to authenticate the paired device. The shared first key k1 is either a public key relating to the token 12 or a private key. Besides data relating to the token 12, the token 12 may be arranged to provide the paired device with data relating to a first server 16.

When the token 12 receives from the phone 14, as device paired with the token 12, data depending on the first key k1 and a predetermined algorithm, the token 12 is able to authenticate the phone 14, and to retrieve original data that is issued from a second server 18 and relayed by the phone 14.

The token 12 may be paired out-of-band with the PC 13, as another paired device and router. When paired with the PC 13, the token 12 is arranged to remain in place and be paired with the PC 13. The token 12 shares with the PC 13 data, like data relating to the PC 13, such as a Media Access Control (or MAC) address of the PC 13, as router. The MAC address constitutes a unique identifier that is assigned to a network interface(s) for communicating through a physical network, like an Internet network. The out-of-band pairing between the token 12 and the concerned device is carried out when they are physically close to each other, by using a short range RF link or a contact link, like a USB link. Once paired with the token 12, the paired device remains physically close to the token 12, so as to communicate with each other and to be used for accessing one or several services offered by a second server 18. When the paired token 12 is not connected to the PC 13, as its local paired device, an access to the second server 18 is prohibited. If the token 12 is stolen, then a token thief is not able to access a service that is offered by a second server to which the paired device may request access. The token 12 is not usable with any other device than the PC 13, as paired local device. Otherwise, i.e. when the token 12 is paired with the PC 13, as paired local terminal, the paired token 12 authorizes to access the second server 18 from the phone 14, as paired remote terminal.

The token 12 user may be able to transmit to the first server 16 data relating to the paired remote device 14 and/or data relating to the paired local device 13, so as to let register it (them).

The token 12 remains under a physical control, thereby controlling physically access to the token 12 and user data, like a user identity. A user who owns the token 12 may plug or unplug, at a desired time, the token 12 to or from the PC 13, as local paired device, respectively. The token 12 may be kept at the individual user's home while the phone 14, as paired mobile device, may be used anywhere outside the individual user's home. The token 12 and the paired device enable mobile access to the second server 18.

To access the second server 18, the token user does not need to reveal any personal user data that originates from either the token memory 124 or the paired distant device, like the phone 14, as paired remote terminal.

The token memory 124 may store securely a Personal Identity Number (or PIN), biometric data (like a finger print(s), a facial print(s) and/or a iris print(s)), as user authentication data, to be matched with user input.

The token memory 124 stores, preferably in a secure manner, at least one key including a first key k1 shared with at least one paired device. Thus, the token 12 and the paired device use the shared first key k1, so as to generate data from original data to be exchanged. Once the token 12 has received the generated data from the paired device, the token 12 is able to retrieve the original data originating from the paired device by also using the shared first key k1. The token 12 is thus able to authenticate at least the phone 14, as paired remote device and preferably the PC 13, as paired local device. The key shared with one paired device may be specific to each concerned device. The token memory 124 stores, preferably in a secure manner, data relating to each of the out-of-band paired device that is associated with a corresponding shared key.

According to a more secure embodiment, the token 12 and the paired device(s) use the shared key k1 and user authentication data, like a PIN or biometric data, entered at the phone 14, as paired remote device, so as to generate data from original data to be exchanged. Once the token 12 has received the generated data from the paired device(s), the token 12 is able to retrieve the original data originating from the paired device(s) by also using the shared key and the user authentication data.

According to one important invention feature, the token 12 is arranged to determine a result, said second result, based upon data to be received, via the first server 16, from an out-of-band paired remote device, and a first key k1 shared with the concerned paired device. To determine the second result, the token 12 may use a predetermined algorithm, like a decryption algorithm, as the inverse algorithm of a predetermined encryption algorithm that is used at the paired remote device, and the shared first key k1 or a key associated with the shared first key k1. The key associated with the shared first key k1 may be a private key associated with the shared first key k1, as the corresponding public key. The second result depends on data that is received from the phone 14, as paired remote terminal, and a first key k1 that is stored or accessible by the phone 14 and shared with the paired remote terminal 14. The second result is e.g. an output of the predetermined algorithm while the received data and the first key k1 are input to the predetermined algorithm.

Once the token 12 has determined the second result, the token 12 sends the second result to a server that is identified within data supplied from either the concerned paired remote device or, through the concerned paired remote device, a second server 18 that the phone user desires to access.

The phone 14 includes at least one battery (not represented), at least one microprocessor (not represented), as data processing means, at least one memory (not represented) and at least one I/O interface.

Instead of a phone, as device paired with the token 12, it may be a Personal Digital Assistant (or PDA), a tablet, a portable PC, a camera, a netbook, a game console or any electronic device including a (micro)processor, as data processing means, at least one memory and at least one I/O interface.

The phone 14 may be equipped with or connected to one or several biometric print readers (not represented), so as to capture one or several finger prints, one or several iris prints, one or several face prints and/or other biometric data, as user authentication data.

The phone microprocessor processes data originating from the phone memory or the outside of the phone 14.

The phone I/O interface may include an interface, so as to exchange data with an outside device, such as a local token (not represented), like a chip soldered or fixed, possibly in a removable manner, to the phone 14, as hosting device, a removable smart card or a USB type dongle.

The phone I/O interface with the local token includes a contact interface or a contact-less interface, so as to exchange between the phone 14 and the token while being physically close to each other.

The phone I/O interface comprises preferably a display screen 142, a keyboard 144 and an antenna 146.

Alternately, instead of two separate elements, the phone 14 includes a touch sensitive display screen that integrates a virtual keyboard (not represented).

The display screen 142 and the keyboard 144, as phone Man Machine Interface (or MMI), is used for exchanging information between a phone user and the phone 14. The phone MMI may be used for exchanging information between a phone user and another entity(ies), like the token 12, a first remote server 16 and a second remote server 18, which the phone 14 is connected preferably through a mobile communication network(s) 110 to.

The phone memory may store user data.

The phone 14 may access a token (not represented) memory that stores, preferably in a secure manner, user data.

As user data, it may include data relating to one or several user accounts, like a bank account.

The phone memory stores data relating to the (out-of-band) paired remote token 12, as data relating to the user device, and/or data relating to a first server 16. The data relating to the user device may include an identifier of the user device, a network address of the user device, like an IP address of the user device, or an identifier of the device that is locally paired with the user device. The data relating to the user device allows addressing the user device, as paired remote device.

Alternatively, instead of the phone 14, as user terminal, a chip or a smart card, as token coupled to the phone 14, stores, preferably in a secure manner, within its memory, data relating to the out-of-band paired remote token 12, as data relating to the user device, and/or data relating to a first server 16 that is also stored by the out-of-band paired remote token 12.

The phone memory stores a first key k1 that is also stored by the paired remote token 12.

Alternately, a chip or a smart card, as token coupled to the phone 14, stores, preferably in a secure manner, within its memory, a first key k1 that is also stored by the out-of-band paired remote token 12.

The phone 14 is therefore able to access the first key k1.

The phone user 15 has preferably to enter a PIN or biometric data, as user authentication data, so as to authenticate the phone user before the out-of-band paired remote token 12. The PIN or user biometric data is preferably encrypted by using a first key k1 that is stored or is accessible by the phone 14 prior to being submitted, in an encrypted manner, to the paired remote token 12.

The phone memory stores a predetermined algorithm, like an encryption algorithm, such as an AES, a DES or the like, to be used with the first key k1 and data to be received.

In another embodiment, a chip or a smart card, as token coupled to the phone 14, stores, preferably in a secure manner, within its memory, a predetermined algorithm, like an encryption algorithm, such as an AES, a DES or the like.

According to one important invention feature, the phone 14 is arranged to determine a result, said first result.

According to another embodiment, instead of the phone 14, a token that is coupled to the phone 14, as hosting device, is arranged to determine the first result.

The first result depends on first data that originates from a second server 18 and a first key k1 that is stored or accessible by the phone 14 and shared with the out-of-band paired remote token 12, as user device. The first result is e.g. an output of the predetermined algorithm while the first data and the first key k1 are input to the predetermined algorithm.

The phone memory stores data relating to a first server 16, like a first network address of the first server 16, its first URL or URI. The data relating to the first server 16 allows identifying uniquely the first server 16. The data relating to the first server may be either entered by a phone user or obtained while pairing with the token 12.

The phone memory stores data relating to the phone 14, such as an International Mobile station Equipment Identity (or IMEI), as a unique number that is used by a mobile radio-communication network to identify a mobile phone.

The phone memory stores data relating to a second server 18, like a second network address of the second server 18, its second URL or URI. The data relating to the second server 18 allows identifying uniquely the second server 18.

The second server 18 may be identified by data relating to the second server 18 that the phone user has entered or selected, through the phone MMI. The phone 14 is able to provide the first server 16 with the data relating to the second server 18.

Alternatively, instead of being provided by the phone user, the second server 18 provides automatically the phone 14 with data relating to either the second server 18 itself or another server (not represented) that is connected to the second server 18 and that is able to authenticate its interlocutor before granting or not this latter access to one or several services offered by or through the second server 18. The data relating to either the second server 18 or another server allows identifying uniquely a server to be addressed by the token 12 while providing the concerned server with data to be used for authenticating (or not) the second server interlocutor.

The phone 14 may have loaded, during a pairing with the token 12, an application to be supported by the phone 14. The application is to be used for authenticating the phone 14 to the token 12, so as to access a second server, as service provider, from the phone 14, as device paired with the token 12.

The phone memory may store one or several embedded applications. As embedded application(s), there is preferably a Web browser, as User Interface (or UI), so as to let interact a phone user with a server(s), like a registered first server 16 and a second server 18. Instead of an application supported by the phone 14, it may be a web page relating to the first server 16 and to be completed automatically with data, as first result that is based upon data to be received from the second server 18.

The antenna 146 is used for exchanging, through a first long-range RF link 17 and the mobile radio-communication network 110, information with the second server 18 that the phone user desires to access.

The antenna 146 is also used for exchanging, through a second long-range RF link 19 and the mobile radio-communication network 110, information with the first server 16, as proxy for addressing the out-of-band paired remote token 12.

The first 17 and/or second 19 long range RF link(s) may be fixed at several hundreds of MHz, for instance, around 850, 900, 1800, 1900 MHz, 2 GHz or more.

The phone 14 is able to transmit to the first server 16 data that results from a predetermined algorithm, the first key k1 and original data to be received from the second server 18.

The first server 16 is connected, through a bi-directional wire and/or wireless link 111, via one (or several) data communication network(s) 110, such as an Internet network to a fleet of tokens, as user devices.

The first server 16 may be included within an "Over The Air" (or OTA) and/or an "Over The Internet" (or OTI) platform(s).

The first server 16 is hosted by a computer.

The first server 16 plays a role of a proxy with respect to a plurality of user devices. A device, e.g. the phone 14, that attempts to address a user device, addresses the first server 16 that relays, when applicable, at least part of the received data to a corresponding paired remote user device, e.g. the token 12.

The first server 16 also plays preferably a role of a manager of tokens, as user devices. The first server 16 manages a plurality of tokens paired with other devices, like terminals.

The first server 16 may be operated by either a mobile radio-communication network operator (or on its behalf) or a service provider (or on its behalf).

The first server 16 is dedicated to running an application(s) for managing a plurality of tokens, as user devices, while at least one user device is paired with a device that addresses, through the first server 16, the paired remote user device.

As application(s), it may further include an application(s) for managing a plurality of tokens, so as to authenticate, activate, de-activate, update and/or upgrade the token, as user device.

The first server 16 includes a processor (not represented), as data processing means, and one or several I/O interfaces (not represented).

The first server 16 includes or accesses a memory 162, as first server memory.

The first server memory 162 stores data relating to each token, as user device, that the first server 16 manages.

The first server memory 162 may store data relating to one or several devices that are paired with each token, as user device(s).

The first server memory 162 may store data for locating each managed token on the data communication network(s) 110.

The first server microprocessor executes preferably security functions, in order to protect access to information stored and managed through or by the first server 16.

The security functions include preferentially an encryption/decryption process to be used prior to sending data to outside/after receiving data from outside, so as to protect access to data managed by the first server 16. To encrypt data to be sent, the first server 16 uses a key and a predetermined algorithm, like an encryption algorithm, such as an AES, a DES or the like, that are both stored within the first server memory 162. To decrypt data to be received, the first server 16 uses a key and a predetermined algorithm, like a decryption algorithm, such as an AES, a DES or the like, that are both stored within the first server memory 162. The decryption algorithm is the inverse algorithm of the encryption algorithm that is used at an emitter side, like the phone 14, as remote device paired with the token 12, and/or the token 12.

The security functions include preferably an interlocutor authentication process. The interlocutor authentication process is used prior to exchanging with its interlocutor. To authenticate the interlocutor, the first server 16 ensures that the originator of data which the first server 16 receives is genuine and authentic. For example, the first server 16 recognizes that its interlocutor is the token 12 if this latter provides a second certificate relating to the token 12. The first server 16 authorizes, when the token 12 is successfully authenticated, a further prosecution, like a running of an application for accessing a service supported by the first server 16, like a relay of data, like the first result, received from a remote device paired with the token 12 to be transmitted to the token 12. The interlocutor authentication process allows the first server 16 to be reached only by the token 12 that the first server 16 has previously authenticated.

The first server 16 is arranged to determine a token, as user device, to be addressed based upon data received from a device that should be paired with the token.

The received data may be data relating to the token 12.

The received data may be other data, like data relating to a device that is paired with the token 12, like data relating to the phone 14, as device paired with the token 12.

The first server memory 162 registers a first database. The first database includes a list of devices, such as one or several terminals and/or one or several tokens, in which each device is paired with one or several user devices, like one or several terminals and/or one or several tokens. The first server 16 is arranged to retrieve data relating to a token, as user device, that is paired with an interlocutor device from which the first server 16 has received data. For example, the first server 16 receives data that identifies uniquely an interlocutor device, such as an IMEI, and deduces from this latter data that allows addressing a corresponding paired user device, like an IP address of the token 12. The first database may associate a user account identifier with other data relating to the concerned user account, like, for each user, an identifier relating to a user device(s), an identifier relating to a corresponding paired device(s) for each user device and/or other data. The first database includes a list of data item(s), said third data item(s), and a corresponding list of data item(s), said fourth data item(s). Each third item identifies a user device. Each third data item is associated with one or several fourth data items. The first server 16 is arranged to determine a third data item that is associated with a fourth data item that is received from an interlocutor device, as assumed device that is paired with a user device. The first server 16 is further arranged to determine a user device based upon the third data item.

Optionally, the first server memory 162 stores a second database. The second database may include a first list of an identifier(s) relating to an authorized server(s), as white list, so as to grant access only to the registered servers, as second servers. The second database may include a second list of an identifier(s) relating to a forbidden server(s), as black list, so as to deny access only to the registered servers, as second servers. The first server 16 is able to restrict access to a second server 18, as authorized and/or non forbidden server.

The first server 16 may be able to generate or let another entity (not represented), like another server connected to the first server 16, generate a key k2, said second key. The second key k2 is preferably associated with an identifier k2id relating to the second key. The first server 16 is able to determine a second key k2 and an identifier k2id relating to the second key.

The first server 16 is able to transmit to a token, as user device, at least some of the data received from a corresponding device that is paired with the token.

The second server 18 is connected, through a bi-directional wire and/or wireless link 113, via one (or several) data communication network(s) 110, to the token 12, as user devices.

The second server 18 is hosted by a computer.

The second server 18 and the first server 16 are distinct from each other and constitute two separate servers.

According to another embodiment (not represented), the first server 16 and the second server 18 are within one computer.

The second server 18 may be connected, through a bi-directional wire and/or wireless link 115, via the data communication network(s) 110, to the first server 16.

The second server 18 includes a processor (not represented), as data processing means, one or several memories (not represented) and one or several I/O interfaces (not represented).

The second server 18 runs an application(s) for delivering one or several services.

The second server 18 may be operated by a service provider or on its behalf.

The second server 18 is able to generate or let another entity (not represented), like another server connected to the second server 18, generate a transaction identifier. The second server 18 is also preferably able to generate or let another entity (not represented), like another server connected to the second server 18, generate a challenge to be associated with the generated transaction identifier. The challenge may be issued by a random number generator.

The second server 18 includes or accesses a memory 182, as second server memory.

The second server memory 182 stores a third database. The third database may include a third list of an identifier(s) relating to a transaction(s), each transaction identifier being associated with a challenge.

The second server 18 runs an application(s) for authenticating its interlocutor.

The second server 18 is able to send to a first interlocutor device first data relating to a transaction identifier and preferably an associated challenge.

The second server 18 registers, for each issued transaction identifier and preferably its associated challenge, data relating to the first interlocutor device, so as to be able to address this latter, when applicable.

According to another embodiment which is more secure, the second server 18 is able to determine or let another entity, like another server connected to the second server 18, determine a second result depending upon the transaction identifier and a second key k2 to be received from the first server 16.

The second server 18 (or another server connected to the second server 18) is further able to determine whether second data received from a second interlocutor device does or does not match the first data sent to the first interlocutor device.

Figure 2:
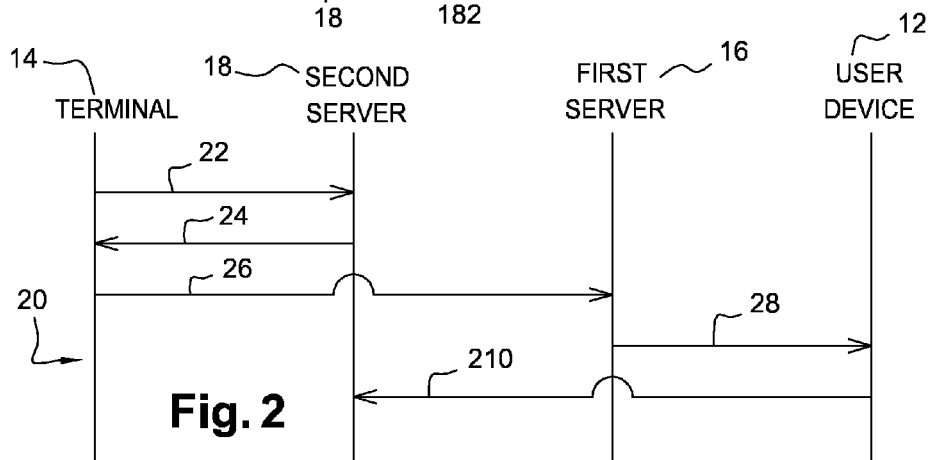
FIG. 2 represents one embodiment of one message flow between notably the mobile phone, the service provider, as issuer of a transaction identifier and a challenge, the central server and the token of FIG. 1, so as to authorize or forbid the mobile phone to access the service provider.

FIG. 2 depicts an exemplary embodiment of the method 20 for accessing a service that involves the phone 14, as user terminal, the second server 18, the first server 16 and the token 12, as user device.

It is assumed that the token 12 is out-of-band paired with, on the one hand, the phone 14, as paired remote device, and on the other hand, the PC 13, as paired local device.

It is also assumed that the token 12 is connected, through the PC 13, to the data communication network(s) 110 and exchanges, through the PC 13, with any entity connected to the communication network(s) 110.

It is further assumed that the phone user selects, through the phone MMI, an application for accessing a service by specifying or selecting the second server 18.

All the involved entities, namely the phone 14, the first 16 and second 18 server and the token 12, exchange data by using, for instance, an HyperText Transfer Protocol Secure (or HTTPS).

Alternately, all the involved entities exchange data by using any other secure data communication protocol.

Firstly, the phone 14 sends to the second server 18 a connection request 22 for connecting to the second server 18.

The second server 18 determines an identifier Tid relating to a transaction, as session identifier, and a challenge CH that is associated with the transaction identifier Tid.

The second server 18 registers an identifier relating to the phone 14, as interlocutor device, associated with the transaction identifier Tid and the challenge CH to be both assigned to the phone 14.

The second server 18 sends, as response 24 to the connection request, to the phone 14 a first message 24 that includes the transaction identifier Tid and the challenge CH, as first data.

The second server 18 also provides the phone 14, as client, with an IP address relating to the second server 18, as addressee of data to be received back by a device paired with the phone 14. The phone 14 relays, through the first server 16, to the token 12 the IP address relating to the second server 18.

The phone 14 (or a token coupled or connected to the phone 14) encrypts the transaction identifier Tid and the challenge CH by using a predetermined encryption algorithm and the first key k1 shared with the token 12.

Alternately, the phone 14 (or a token coupled or connected to the phone 14) encrypts only the challenge by using a predetermined encryption algorithm and the first key k1.

Alternatively, the phone 14 (or a token coupled or connected to the phone 14) encrypts only the transaction identifier by using a predetermined encryption algorithm and the first key k1.

The phone 14 may send the transaction identifier Tid or the challenge CH that is not encrypted in clear data.

The phone 14 thus determines a first result R1 that depends on the first key k1 and the transaction identifier Tid and/or the challenge CH.

According to a more secure embodiment, the phone 14 requests to enter a PIN or biometric data, as user authentication data, and the phone 14 (or a token coupled or connected to the phone 14) determines a first result R1 that depends on the first key k1 and the user authentication data and the transaction identifier Tid and/or the challenge CH. For instance, the phone 14 encrypts the transaction identifier Tid and/or the challenge CH by using the entered PIN, as encryption key, and encrypts the encrypted data by using the first key k1, so as to generate a first result R1.

Then, the phone 14 sends to a first server 16 a second message 26 that includes the first result R1 and an IMEI, as data relating to the device paired with the token 12 and data relating to the token 12.

Since the token 12 is not directly identified due to a transmission of data relating to the paired remote device, the token 12 is not identifiable by a fraudster who spies data that the phone 14 transmits.

Instead of the IMEI, as fourth data item, the phone 14 transmits an IP address relating to the token 12, as data relating to the user device.

The phone 14 identifies preferably, in an automatic manner, the first server 16 with an IP address relating to the first server 16, as data relating to the first server 16 that is stored or accessible by the phone 14. The data relating to the first server 16 and stored at the phone 14 side allows identifying the first server 16 is loaded during a pairing of the phone 14 with the token 12.

Alternately, the phone 14 user selects or identifies, through the phone MMI, the first server 16.

The first server 16 stores the received data and data relating to the device that sends the received data. The received data allows a token, as user device, to authenticate an originator of the received data, as device paired with the token. The received data relating to the device allows the first server 16 to address a token paired with an originator of the received data.

The first server 16 determines a token, as user device, to be addressed based upon the data relating to the user device that is received from the phone 14 and possibly data to be received from the concerned paired token 12.

Instead of waiting for data to be received from the concerned paired token 12, to determine the token to be addressed, the first server 16 determines an IP address relating to the token 12 that is paired with the identified phone 14 based upon data stored at the first server 16 side. To determine the IP address relating to the token 12, as third data item, the first server 16 uses a list of IP addresses relating to tokens, as third data item list, and a corresponding list of IMEI relating to devices paired with tokens, as fourth data item list, that are both stored at the first server 16 side. Each third data item identifies one token, as user device. One fourth data item is associated with one third data item.

The first server 16 retrieves, based upon the received IMEI, as fourth data item, an IP address relating to the token 12, as third data item, that is associated with the received IMEI.

According to another embodiment, the token 12 asks at least once (pull mode) the first server 16 whether at least one connection request for connecting to the second server 18 is pending by submitting the concerned IMEI, as fourth data item and data relating to the paired device. According to such an embodiment, the first server 16 may not be aware of the paired device prior to receiving the connection request(s) that originate(s) from the token 12.

Once the first server 16 has identified the token 12 to be addressed, the first server 16 sends to the token 12 a third message 28 that includes the first result R1.

The token 12 decrypts the first result R1 by using a predetermined decryption algorithm, as inverse algorithm of the encryption algorithm used at the phone 14 side, and the first key k1 shared with the phone 14.

According to a more secure embodiment, the token 12 decrypts the first result R1 that depends on the first key k1 and the user authentication data and the transaction identifier Tid and/or the challenge CH. For instance, the token 12 decrypts the received first result R1 by using firstly the first key k1 and then the stored user authentication data, as decryption keys, so as to retrieve the transaction identifier Tid and/or the challenge CH. The token 12 verifies whether the entered user authentication data does or does not match user authentication data stored within the token 12. If the entered user authentication data matches the stored user authentication data, then the token 12 authenticates successfully the phone 14 user as an authorized user and authorizes to go further. Otherwise, i.e. if the entered user authentication data does not match the stored user authentication data, the phone 14 user is not authenticated and therefore not authorized. When the phone 14 user is not authenticated, the token 12 forbids to go further by possibly rejecting or aborting a requested access to the second server 18. Thus, the token 12 authenticates the phone 14 and the phone user.

After a decryption carried out by the token 12, the token 12 determines the transaction identifier Tid and/or the challenge CH that has(have) been encrypted at the phone 14 side.

The token 12 determines the transaction identifier Tid and/or the challenge CH based upon the first result R1, the first key k1 and possibly the user authentication data.

The token 12 identifies the second server 18 with an IP address relating to the second server 18 that is also received, through the first server 16, from the phone 14, as data relating to the second server 18.

The token 12, as user device, sends to the second server 18 a fourth message 210 that includes the transaction identifier Tid and the challenge CH, as second data.

The second server 18 verifies that the second data received from the token 12 does match the first data sent to the phone 14.

If the second data does not match the first data, then the second server 18 forbids the phone 14 to connect to the second server 18 by sending possibly to the phone 14 a message for informing that the access to the second server 18 is denied.

Otherwise, i.e. when the second data matches the first data, the second server 18 authorizes the phone 14 to connect to the second server 18. Then, the second server 18 may send to the phone 14 one or several pages, as data for accessing one or several proposed services.

Figure 3:
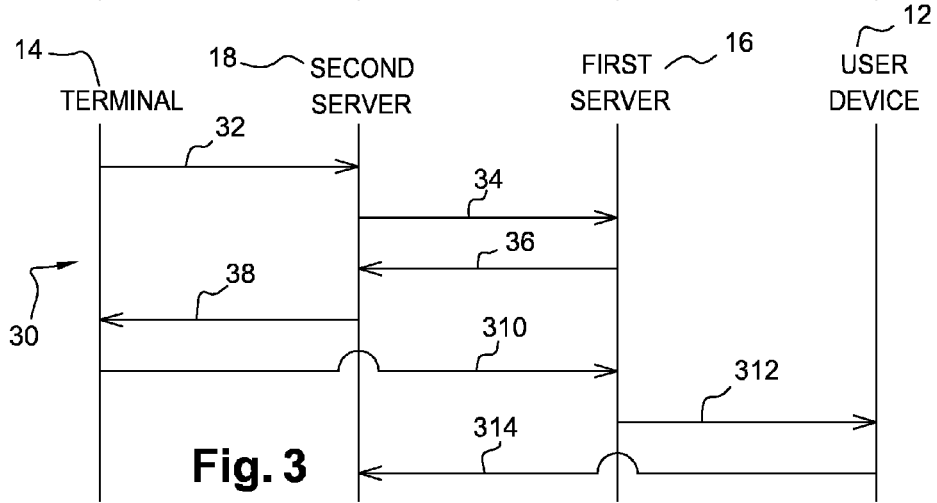
FIG. 3 is a more secure embodiment of one message flow between notably the mobile phone, the service provider, as issuer of an encrypted transaction identifier and a challenge, the central server and the token of FIG. 1, so as to authorize or forbid the mobile phone to access the service provider.

FIG. 3 shows an exemplary embodiment of the method 30 for accessing a service.

The assumptions that are specified herein above in relation with FIG. 2 are still valid.

Firstly, the phone 14 sends to the second server 18 a connection request 32 for connecting to the second server 18.

The second server 18 sends to the first server 16 a data request 34 for receiving a second key k2 and an identifier k2id relating to the second key.

The first server 16 determines a second key k2 and an identifier k2id relating to the second key, as second key identifier. The second key identifier k2id is associated with the second key k2.

The first server 16 sends to the second server 18 a first message 36 that includes the second key k2 and the second key identifier k2id.

The second server 18 determines an identifier Tid relating to a transaction, as session identifier, and a challenge CH. The challenge CH is associated with the transaction identifier Tid.

The second server 18 registers an identifier relating to the phone 14, as interlocutor device, associated with the transaction identifier Tid and the challenge CH to be both assigned to the phone 14.

The second server 18 determines a second result R2 depending upon the transaction identifier Tid, as session identifier, and the second key k2. For instance, the second server 18 encrypts the transaction identifier Tid by using a predetermined encryption algorithm, like a DES or an AES, and the second key k2, so as to generate a second result R2.

The second server 18 sends to the phone 14, as response to the connection request 32, a second message 38 that includes the second result R2, the second key identifier k2id and the challenge CH.

The second server 18 also provides the phone 14, as client, with an IP address relating to the second server 18, as addressee of data to be received back by a device paired with the phone 14. The phone 14 relays, through the first server 16, to the token 12 the IP address relating to the second server 18.

The phone 14 (or a token coupled or connected to the phone 14) encrypts the challenge CH by using a predetermined encryption algorithm and the first key k1 shared with the token 12.

The phone 14 thus determines a third result R3 that depends on the first key k1 and the challenge CH.

According to a more secure embodiment, the phone 14 requests to enter a PIN or biometric data, as user authentication data, and the phone 14 (or a token coupled or connected to the phone 14) determines a third result R3 that depends on the first key k1, the user authentication data and the challenge CH. For instance, the phone 14 encrypts the challenge CH by using the entered user authentication data, as encryption key, and encrypts the encrypted data by using the first key k1, so as to generate a third result R3.

Then, the phone 14 sends to a first server 16 a third message 310 that includes the second result R2, the third result R3, the second key identifier k2id and an IMEI, as data relating to the device paired with the token 12 and data relating to the token 12.

Instead of the IMEI, as fourth data item, the phone 14 transmits an IP address relating to the token 12, as data relating to the user device.

The phone 14 or the phone 14 user identifies the first server 16.

The first server 16 determines the second key k2 that is associated with the received second key identifier k2id.

The first server 16 determines the transaction identifier Tid based upon the second result R2 and the second key k2. For instance, the first server 16 decrypts the second result R2 by using a predetermined decryption algorithm and the second key k2.

The first server 16 determines a token, as user device, to be addressed based upon the data relating to the user device that is received from the phone 14 and possibly data to be received from the concerned paired token 12.

Instead of waiting for data to be received from the concerned paired token 12, to determine the token to be addressed, the first server 16 determines an IP address relating to the token 12 that is paired with the identified phone 14 based upon data stored at the first server 16 side. To determine the IP address relating to the token 12, as third data item, the first server 16 uses a list of IP addresses relating to tokens, as third data item list, and a corresponding list of IMEI relating to devices paired with tokens, as fourth data item list, that are both stored at the first server 16 side. Each third data item identifies one token, as user device. One fourth data item is associated with one third data item.

The first server 16 retrieves, based upon the received IMEI, as fourth data item, an IP address relating to the token 12, as third data item, that is associated with the received IMEI.

According to another embodiment, the token 12 asks at least once (pull mode) the first server 16 whether at least one connection request for connecting to the second server 18 is pending by submitting possibly the concerned IMEI, as fourth data item and data relating to the paired device. According to such an embodiment, the first server 16 may not be aware of the paired device prior to receiving the connection request(s) that originate(s) from the token 12.

Once the first server 16 has identified the token 12 to be addressed, the first server 16 sends to the token 12 a fourth message 312 that includes the transaction identifier Tid and the third result R3.

The token 12 decrypts the third result R3 by using a predetermined decryption algorithm, as inverse algorithm of the encryption algorithm used at the phone 14 side, and the first key k1 shared with the phone 14.

According to a more secure embodiment, the token 12 decrypts the third result R3 that depends on the first key k1 and the user authentication data and the challenge CH. For instance, the token 12 decrypts the received third result R3 by using firstly the first key k1 and then the stored user authentication data, as decryption keys, so as to retrieve the challenge CH. The token 12 verifies whether the entered user authentication data does or does not match user authentication data stored within the token 12. If the entered user authentication data matches the stored user authentication data, then the token 12 authenticates successfully the phone 14 user as an authorized user and authorizes to go further. Otherwise, i.e. if the entered user authentication data does not match the stored user authentication data, the phone 14 user is not authenticated and therefore not authorized. When the phone 14 user is not authenticated, the token 12 forbids to go further by possibly rejecting or aborting a requested access to the second server 18. Thus, the token 12 authenticates the phone 14 and the phone user.

After a decryption carried out by the token 12, the token 12 determines the challenge CH that has(have) been encrypted at the phone 14 side.

The token 12 identifies the second server 18 with an IP address relating to the second server 18 that is also received, through the first server 16, from the phone 14, as data relating to the second server 18.

The token 12, as user device, sends to the second server 18 a fifth message 314 that includes the transaction identifier Tid and the challenge CH, as fifth data.

The second server 18 verifies that the fifth data received from the token 12 does match the transaction identifier Tid and the challenge CH both assigned to the phone 14.

If the fifth data received from the token 12 does match the transaction identifier Tid and the challenge CH, then the second server 18 authorizes the phone 14 to connect to the second server 18 by sending to the phone 14 data for accessing one or several proposed services.

Otherwise, i.e. when the issued challenge CH and transaction identifier Tid have not been returned back by the token 12, the second server 18 denies a connection from the phone 14.

The embodiments that have just been described are not intended to limit the scope of the concerned invention. Other embodiments may be given. As another embodiment, instead of exchanging with a single second server 18, on the one hand, the phone 14 addresses the second server 18, as first server, and on the other hand, the paired token 12 addresses a second server (not represented) that is connected to the second server 18 and that is dedicated to authenticating its interlocutor while the first server 18 provides a service(s) to the phone 14, when authenticated.

The invention claimed is:

1. A method for accessing a service,
wherein the method is implemented by at least one user device storing at least one first key and at least one user terminal storing or accessing the at least one first key, and wherein the at least one user device is connected to a first server,
the method comprising the following steps:
  a) the terminal sends to at least one second server a connection request for connecting to the second server;
  b) the second server determines a challenge and an associated transaction identifier;
  c) the second server sends to the terminal the transaction identifier and the challenge;
  d) the terminal determines a first result depending upon the first key and at least one of the challenge and the transaction identifier;
  e) the terminal sends to the first server the first result, and a data item relating to the user device;
  f) the first server sends, based upon the data item relating to the user device, to the user device, the first result;
  g) the user device determines at least one of the challenge and the transaction identifier based upon the first result and the first key;
  h) the user device sends to the second server the transaction identifier and the challenge;
  i) the second server verifies whether the transaction identifier and the challenge received from the user device do or do not match the transaction identifier and the challenge sent to the terminal; and
  j) only if the transaction identifier and the challenge received from the user device match the transaction identifier and the challenge sent to the terminal, the second server authorizes the terminal to connect to the second server.

2. The method according to claim 1, wherein, each of the at least one user device stores user authentication data, the terminal requests to enter user authentication data, the terminal determines a second result depending on the entered user authentication data and the first key, and at least one of the transaction identifier and the challenge, the terminal sends, through the first server and to the user device, the second result instead of the first result, the user device determines at least one of the challenge and the transaction identifier based upon the second result, the stored user authentication data and the first key while authentication the user or not authentication the user.

3. The method according to claim 1, wherein, the first server stores or accesses a list of at least one token data item and a corresponding list of at least one user device data item, the terminal sends to the first server the first result and a user device data item, the first server determines a token data item that is associated with the user device data item, the first server determines a token, as a user device, based upon the token data item.

4. The method according to claim 1, wherein, prior to sending data from the second server to the terminal:
  the second server sends, to the first server, a data request for receiving a second key and an identifier relating to the second key;
  the first server determines a second key and an associated identifier relating to the second key;
  the first server sends, to the second server, the second key and the second key identifier;
  the second server sends, to the terminal, the challenge, the third result, and the second key identifier;
  the terminal determines a fourth result depending on the challenge and the first key;
  the terminal sends, to the first server, the third result, the fourth result, and the second key identifier;
  the first server determines, based upon the third result and the second key, the transaction identifier;
  the first server determines, based upon the third result and the second key, the transaction identifier;
  the first server sends, to the user device, the fourth result and the transaction identifier;
  the user device determines, based upon the fourth result and the first key, the challenge; and
  steps h), i) and j) are carried out.

5. The method according to claim 1, wherein the first server sends to the user device a first certificate relating to the first server.

6. The method according to claim 1, wherein the user device sends to the first server and/or the second server a second certificate relating to the user device.

7. The method according to claim 1, wherein the user device asks at least once the first server whether at least one connection request for connecting to the second server is pending.

8. The method according to claim 1, wherein the first server stores a first list of at least one identifier relating to an authorized second server and/or a second list of at least one identifier relating to a forbidden second server.

9. The method according to claim 1, wherein the first server, the second server, the terminal and the user device use a secure communication protocol for communicating data.

10. A system for accessing a service,
wherein the system comprises a first server and at least one second server, at least one user device and at least one user terminal, each of the at least one user device comprising means for storing at least one first key, at least one user terminal comprising means for storing or accessing the at least one first key, the user device comprising or being connected to means for connecting to the first server,
wherein the terminal comprises means for sending to one second server a connection request for connecting to the second server;
wherein the second server comprises:
  means for determining a challenge and an associated transaction identifier;
  means for sending, to the terminal the transaction identifier and the challenge;

wherein the terminal comprises:
    means for determining a first result depending upon the first key and at least one of the challenge and the transaction identifier;
    means for sending to the first server at least the first result and a data item relating to the user device;
wherein the first server comprises
    means for sending, based upon the data item relating to the user device, to the user device, at least the first result;
wherein the user device comprises:
    means for determining at least one of the challenge and the transaction identifier based upon the first result and the first key;
    means for sending to the second server the transaction identifier and the challenge; and
wherein the second server further comprises:
    means for verifying whether the transaction identifier and the challenge received from the user device does or does not match the transaction identifier and the challenge sent to the terminal;
    means for authorizing the terminal to connect to the second server only if the transaction identifier and the challenge received from the user device matches the transaction identifier and the challenge sent to the terminal.

* * * * *